(12) United States Patent
D'Angelo et al.

(10) Patent No.: US 12,051,169 B2
(45) Date of Patent: Jul. 30, 2024

(54) INTERACTIVE ENGAGEMENT PORTALS WITHIN VIRTUAL EXPERIENCES

(71) Applicant: Roblox Corporation, San Mateo, CA (US)

(72) Inventors: Enrico D'Angelo, Los angeles, CA (US); Richard Sim, Belmont, CA (US); Manuel Bronstein, San Mateo, CA (US); Dmitri V. Parks, Denver, CO (US); Sari Abukhadra, Foster City, CA (US); Gary Wu, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 98 days.

(21) Appl. No.: 17/965,725

(22) Filed: Oct. 13, 2022

(65) Prior Publication Data

US 2023/0117482 A1    Apr. 20, 2023

Related U.S. Application Data

(60) Provisional application No. 63/404,819, filed on Sep. 8, 2022, provisional application No. 63/255,462, filed on Oct. 14, 2021.

(51) Int. Cl.
| | | |
|---|---|---|
| *G06T 19/20* | (2011.01) | |
| *G06Q 20/06* | (2012.01) | |
| *G06Q 20/10* | (2012.01) | |
| *G06Q 20/36* | (2012.01) | |
| *G06Q 30/0241* | (2023.01) | |

(Continued)

(52) U.S. Cl.
CPC ............. *G06T 19/20* (2013.01); *G06Q 20/10* (2013.01); *G06Q 30/0255* (2013.01); *G06Q 30/0643* (2013.01); *G06T 13/40* (2013.01); *G06T 17/00* (2013.01); *G06T 19/003* (2013.01);

(Continued)

(58) Field of Classification Search
CPC ......... G06T 19/20; G06T 13/40; G06T 17/00; G06T 19/003; G06Q 20/10; G06Q 30/0255; G06Q 30/0643; G06Q 20/065; G06Q 20/36; G06Q 30/0269; G06Q 30/0277

See application file for complete search history.

(56) References Cited

U.S. PATENT DOCUMENTS

| | | | |
|---|---|---|---|
| 8,407,086 B2 * | 3/2013 | Kusumoto | ......... G06Q 30/0214 705/1.1 |
| 11,412,011 B1 * | 8/2022 | Benjamin | ............... H04L 67/02 |

(Continued)

*Primary Examiner* — YuJang Tswei
(74) *Attorney, Agent, or Firm* — IP Spring

(57) ABSTRACT

Some implementations relate to methods, systems, and computer-readable media for digital advertising within a first virtual experience provided at a virtual experience platform. A virtual user engagement portal is provided within the first virtual experience that includes a portal member configured to transport an avatar to a second virtual experience. The second virtual experience may be associated with at least one media item, and may include a plurality of virtual items, activities, and other virtual content associated with the at least one media item. A return portal may be provided within the second virtual experience to return an avatar to the first virtual experience. User engagement metrics and/or advertising metrics may be aggregated and/or computed based on avatar interactions within the second virtual experience.

20 Claims, 7 Drawing Sheets

(51) Int. Cl.
*G06Q 30/0251* (2023.01)
*G06Q 30/0601* (2023.01)
*G06T 13/40* (2011.01)
*G06T 17/00* (2006.01)
*G06T 19/00* (2011.01)

(52) U.S. Cl.
CPC ........... *G06Q 20/065* (2013.01); *G06Q 20/36* (2013.01); *G06Q 30/0269* (2013.01); *G06Q 30/0277* (2013.01)

(56) References Cited

U.S. PATENT DOCUMENTS

| | | | | |
|---|---|---|---|---|
| 2009/0077475 | A1* | 3/2009 | Koster | A63F 13/12 |
| | | | | 715/757 |
| 2016/0127811 | A1* | 5/2016 | Amokrane | H04L 41/0896 |
| | | | | 398/58 |
| 2019/0287313 | A1* | 9/2019 | Kavallierou | H04N 21/466 |
| 2022/0252881 | A1* | 8/2022 | Wieczorek | G02B 27/017 |

* cited by examiner

INTERACTIVE ENGAGEMENT PORTALS WITHIN VIRTUAL EXPERIENCES

CROSS-REFERENCE TO RELATED APPLICATIONS

This application is a non-provisional application that claims priority under 35 U.S.C. § 119(e) to U.S. Provisional Patent Application No. 63/255,462, filed on Oct. 14, 2021, entitled "Techniques for Discovery of Virtual Experiences," and to U.S. Provisional Patent Application No. 63/404,819, filed on Sep. 8, 2022, entitled "Interactive Engagement Portals within Virtual Experiences," both of which are hereby incorporated by reference herein in their entireties.

TECHNICAL FIELD

Embodiments relate generally to online virtual experience platforms, and more particularly, to methods, systems, and computer readable media for interactive digital advertising within virtual experiences.

BACKGROUND

Online platforms, such as virtual experience platforms and online gaming platforms, can sometimes include digital advertisements for virtual items users can purchase. However, it can be difficult to create determine a level of engagement of users based on the advertisements. For example, some users may always purchase a virtual item for use in a pre-determined gaming scenario or goal and engagement metrics may therefore be difficult to ascertain. Other users may actively ignore advertisements and still purchase virtual items. Furthermore, there may be other users that engage with advertisements but do not actively purchase for one reason or another. Example embodiments are presented herein that overcome these and other drawbacks.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to provide digital advertisements in virtual experiences.

According to one aspect, a computer-implemented method of digital advertising within a first virtual experience provided at a virtual experience platform is provided, the method comprising: receiving virtual experience content associated with a second virtual experience, the received virtual experience content including at least one media item; presenting the received virtual experience content within the first virtual experience in a virtual user engagement portal, the virtual user engagement portal having a display member configured to display first media associated with the at least one media item and a virtual user engagement portal proximate the display member, wherein the display member is rendered and displayed in the first virtual experience, wherein the virtual user engagement portal includes a logical connection from the first virtual experience to the second virtual experience, and wherein the virtual user engagement portal is displayed in both the first virtual experience and the second virtual experience; receiving first indication that a first avatar associated with a first user identifier (ID) has engaged with the virtual user engagement portal in the first virtual experience; transporting the first avatar to the second virtual experience from the first virtual experience responsive to the first indication; receiving second indication that the first avatar has engaged with the virtual user engagement portal in the second virtual experience; transporting the first avatar to the first virtual experience from the second virtual experience responsive to the second indication; and assigning a user engagement metric to the at least one media item based upon the first indication and the second indication.

Various implementations of the computer-implemented method are described.

According to one implementation, the received virtual experience content is associated with a second user ID of the virtual experience platform, the method further comprising: receiving a purchase request for a virtual item in the second virtual experience; and completing the purchase request.

According to one implementation, the purchase request includes a virtual currency amount displayed in association with the virtual item in the second virtual experience.

According to one implementation, the virtual item is associated with a physical item, wherein attributes of the physical item are displayed in the second virtual experience, the computer-implemented method further comprising: completing a transaction at the virtual experience platform, the transaction including the physical item.

According to one implementation, the second virtual experience is a virtual marketplace that includes the at least one media item.

According to one implementation, the user engagement metric comprises at least an amount of time spent in the second virtual experience.

According to one implementation, the user engagement metric further comprises one or more of: a number of purchases related to the at least one media item, a number of unique visits to the second virtual experience, and a number of revisits to the second virtual experience.

According to one implementation, the computer-implemented method further comprises: storing a first data structure associated with the first user ID in a database, the first data structure comprising a virtual experience origin location portion, a virtual currency wallet portion, and an engagement data portion.

According to one implementation, assigning the user engagement metric comprises: retrieving user engagement data from the engagement data portion of the first data structure; and aggregating the retrieved user engagement data with other engagement data associated with the at least one media item.

According to one implementation, the computer-implemented method further comprises altering a display of the displayed first media and the portal member based upon the first user ID and avatar proximity to the virtual user engagement portal.

According to one implementation, altering the display comprises altering the display member to display a second media based upon an avatar in closest proximity to the virtual user engagement portal.

According to one implementation, altering the display comprises altering the display member to display a second media configured to be viewed by a second avatar associated with a second user ID, wherein the first displayed media is configured to be viewed by the first avatar, and wherein the first avatar and the second avatar are within the first virtual experience.

According to one implementation, altering the display comprises displaying customized media based upon an avatar viewing the virtual user engagement portal.

According to one implementation, the user engagement metric comprises one or more of: a duration of a view of the displayed first media, a continuous duration of a view of the displayed first media, legibility of the displayed first media based on first avatar distance to the displayed first media, percentage of the displayed first media that is viewable to the first avatar, or angle of view between the displayed first media and the first avatar.

According to one implementation, the user engagement metric comprises one or more of: engagement with the displayed first media, the first indication, the second indication, an amount of time between the first indication and the second indication, a percentage of rendering of the second virtual experience before the second indication, playtime in the second virtual experience, activities in the second virtual experience, purchases in the second virtual experience, avatar interactions with virtual items in the second virtual experience, or avatar interactions with non-player characters in the second virtual experience.

According to one implementation, the virtual item comprises functional attributes that modify avatar-behavior of an avatar associated with a user ID that purchases the virtual item.

According to one implementation, the functional attributes comprise one or more of: speed of avatar motion, height of avatar jump, strength of avatar interaction, or size of avatar.

According to one implementation, presenting the received virtual experience content and the virtual user engagement portal is based upon controls comprising on or more of: number of advertisements per time period, types of advertisements, desired users, content-adjacency, or behavior of the advertisement.

In another aspect, a non-transitory computer-readable medium is described with instructions stored thereon that, responsive to execution by a processing device, causes the processing device to perform operations comprising: receiving virtual experience content associated with a second virtual experience, the received virtual experience content including at least one media item; presenting the received virtual experience content within the first virtual experience in a virtual user engagement portal, the virtual user engagement portal having a display member configured to display first media associated with the at least one media item and a virtual user engagement portal proximate the display member, wherein the display member is rendered and displayed in the first virtual experience, wherein the virtual user engagement portal includes a logical connection from the first virtual experience to the second virtual experience, and wherein the virtual user engagement portal is displayed in both the first virtual experience and the second virtual experience; receiving first indication that a first avatar associated with a first user identifier (ID) has engaged with the virtual user engagement portal in the first virtual experience; transporting the first avatar to the second virtual experience from the first virtual experience responsive to the first indication; receiving second indication that the first avatar has engaged with the virtual user engagement portal in the second virtual experience; transporting the first avatar to the first virtual experience from the second virtual experience responsive to the second indication; and assigning a user engagement metric to the at least one media item based upon the first indication and the second indication.

Various implementations of the non-transitory computer-readable medium are described.

In another aspect, a system is described, comprising: a memory with instructions stored thereon; and a processing device, coupled to the memory and operable to access the memory, wherein the instructions when executed by the processing device, cause the processing device to perform operations including: receiving virtual experience content associated with a second virtual experience, the received virtual experience content including at least one media item; presenting the received virtual experience content within the first virtual experience in a virtual user engagement portal, the virtual user engagement portal having a display member configured to display first media associated with the at least one media item and a virtual user engagement portal proximate the display member, wherein the display member is rendered and displayed in the first virtual experience, wherein the virtual user engagement portal includes a logical connection from the first virtual experience to the second virtual experience, and wherein the virtual user engagement portal is displayed in both the first virtual experience and the second virtual experience; receiving first indication that a first avatar associated with a first user identifier (ID) has engaged with the virtual user engagement portal in the first virtual experience; transporting the first avatar to the second virtual experience from the first virtual experience responsive to the first indication; receiving second indication that the first avatar has engaged with the virtual user engagement portal in the second virtual experience; transporting the first avatar to the first virtual experience from the second virtual experience responsive to the second indication; and assigning a user engagement metric to the at least one media item based upon the first indication and the second indication.

Various implementations of the system are described.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
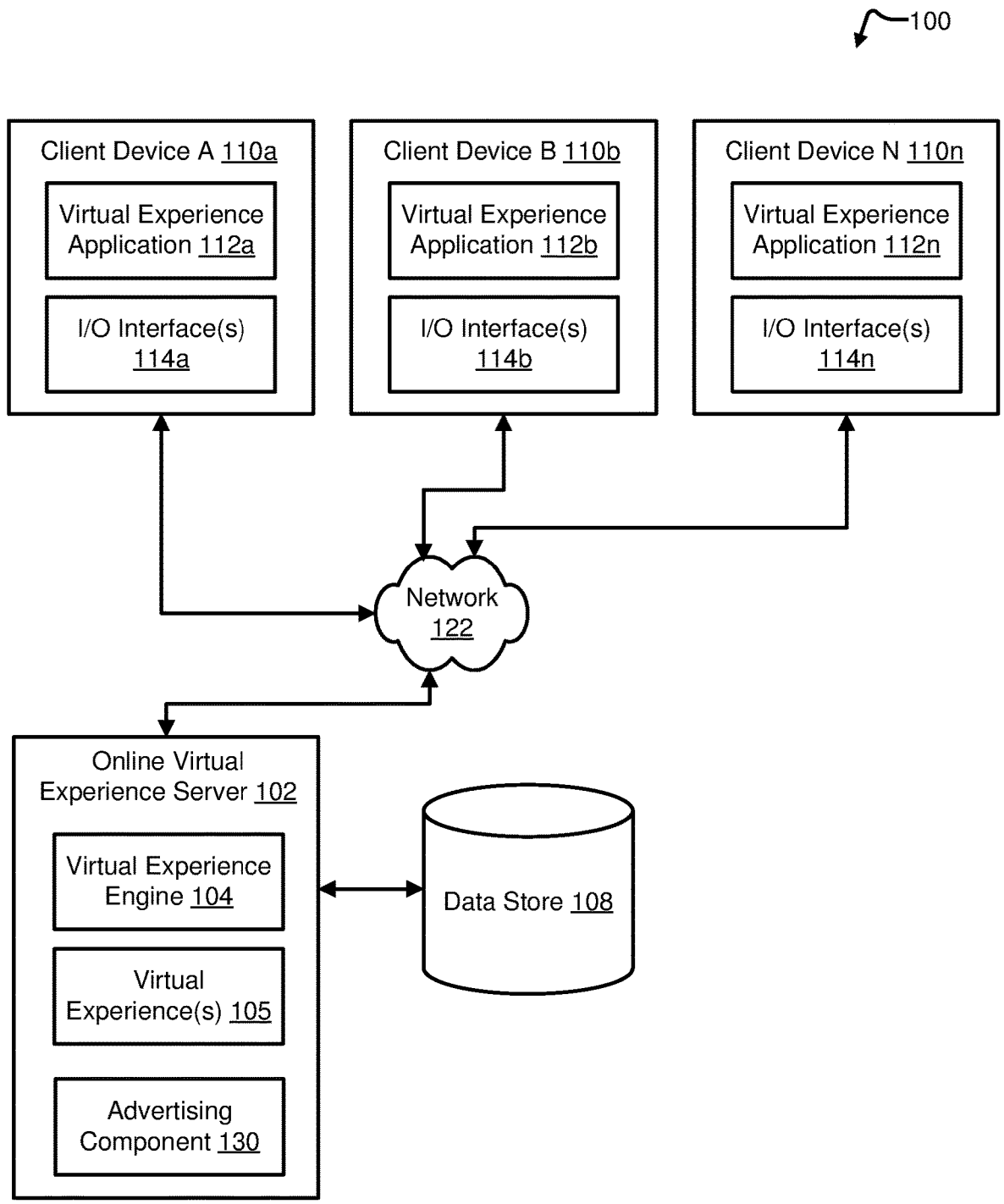
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

In some aspects, systems and methods are provided for interactive digital advertising within a virtual experience. Online platforms, such as online virtual experience platforms, generally provide an ability to create, store, advertise, and present for purchase virtual items to be used in virtual experiences.

For example, virtual experience platforms may include user-generated content or developer-generated content (each referred to as "UGC" herein). The UGC may be stored and implemented through the virtual experience platform, for example, by allowing users to search and interact with various virtual experiences and associated virtual items. Virtual items may be presented in a search interface or inventory screen, whereby users may peruse virtual items, search for new virtual items, and/or purchase virtual items prior to entering a virtual experience.

While search interfaces and inventory screens allow users to search for items, virtual experiences provide an immersive experience for a user. For example, avatars may move about virtual experiences and interact with a plurality of virtual items in a typical virtual experience.

Example embodiments may provide an interactive virtual user engagement portal, within a first virtual experience, to allow an avatar to be transported to a second virtual experience, such that the avatar may interact with virtual items that are part of a digital advertising experience. The interactive advertising may be triggered by an avatar's approach towards (or being close to) a virtual user engagement portal and an associated portal member. Upon the avatar reaching a point within a threshold distance from the portal member, an advertising component may direct the virtual user engagement portal to alter its appearance to denote and/or display first media associated with at least one media item, such as a movie, film, music record, product, experience, or other media item. The first media may include a banner or other visual display that can be tailored and chosen based on the avatar's unique user ID.

The virtual user engagement portal may automatically transport an avatar to the second virtual experience as the avatar walks through the portal or otherwise engages with the portal itself. The second virtual experience may enable the avatar to engage with, interact with, and/or purchase virtual items that are associated with the media item. For example, particular clothing, accessories, weapons, or other items associated with a movie may be presented. In another example, particular sports equipment associated with a sports team may be presented. Additionally, the virtual user engagement portal may further present a plurality of virtual items that the avatar may interact with, such as by controlling user interface elements in the second virtual experience. The virtual user engagement portal may also temporarily allow the avatar to employ, utilize, and/or wear the virtual item prior to any purchase.

According to implementations and embodiments described herein in detail, an online virtual experience platform may deploy an advertising component at a server, and one or more virtual user engagement portals within one or more virtual experiences. The advertising component, by considering user data, may provide interactive digital advertising of virtual items in an interactive, engaging, and suitable second virtual experience depending upon the relevant user data. These and other suitable example embodiments will become apparent in this disclosure.

It is noted that any use of user and/or developer data to determine users' interests, identify matching items, or any other purpose is specifically with permission from the user, in accordance with applicable regulations, and can be turned off by the user. User can also choose what data to permit for such use. User data is stored securely and in compliance with rules and laws. Furthermore, data collection is not performed in certain geo locales, for certain user categories (e.g., based on age or other demographic), is temporary (data are discarded after a period of time), and is stored securely even when only used temporarily. Moreover, user data are not shared with third-parties. Even further, some data may be anonymized, aggregated across users, or otherwise modified so that a specific user identity cannot be determined.

Hereinafter, further details surrounding example embodiments and various aspects of this disclosure are described with reference to the many figures.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The network environment 100 (also referred to as a "platform" herein) includes an online virtual experience server 102, a data store 108, and a client device 110 (or multiple client devices), all coupled via a network 122.

The online virtual experience server 102 can include, among other things, a virtual experience engine 104, one or more virtual experiences 105, and an advertising component 130. The online virtual experience server 102 may be configured to provide virtual experiences 105 to one or more client devices 110, and to provide interactive digital advertisements via the advertising component 130, in some implementations. Furthermore, as will be described more fully below, the advertising component 130 may also control one or more virtual user engagement portals within virtual experience(s) 105.

Data store 108 is shown coupled to online virtual experience server 102 but in some implementations, can also be provided as part of the online virtual experience server 102. The data store may, in some implementations, be configured to store advertising data, user data, engagement data, and/or other contextual data in association with the advertising component 130.

The client devices 110 (e.g., 110a, 110b, 110n) can include a virtual experience application 112 (e.g., 112a, 112b, 112n) and an I/O interface 114 (e.g., 114a, 114b, 114n), to interact with the online virtual experience server 102, and to view, for example, graphical user interfaces (GUI) through a computer monitor or display (not illustrated). In some implementations, the client devices 110 may be configured to execute and display virtual experiences, which may include virtual user engagement portal s as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., user 114 via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience, a user's avatar may approach a virtual user engagement portal and be transported to a second, different virtual experience through the portal. Using data related to context, user interactions, and user engagement with various virtual items in the second virtual experience, advertising impressions of the new second virtual experience may be tracked. Technical effects and benefits of this approach include improved user engagement, reduced use of search tools to locate virtual items, improved revenue for developers of UGC, as well as improved safety in transactions in the virtual metaverse.

In some implementations, the advertising component 130 may provide control and provisioning of virtual user engagement portals within virtual experiences served by the online virtual experience platform 100. For example, virtual user engagement portals may allow avatars to be transported, automatically, from a first virtual experience to a second virtual experience that is a unique and engaging digital advertising experience.

The advertising component 130 may receive indications that particular avatars are within a threshold distance of the virtual user engagement portals and may present tailored advertising on the virtual user engagement portals. The tailored advertising may appear different depending upon which avatar is viewing the virtual user engagement portal. For example, two different avatars that are viewing the same virtual user engagement portal within the same virtual experience may see the same or different advertising (or other content) on the virtual user engagement portal. For example, the advertising may be tailored based on various user-permitted data regarding the users associated with each avatar, such as demographic data (age, location, gender), activity data within the virtual experience or from other virtual experiences on the virtual experience platform, etc.

The advertising component 130 may further transport avatars that interact or walk-through a portal to the second virtual experience, from the first virtual experience. During gameplay or interaction with the second virtual experience, the advertising component 130 may record metrics associated with user engagement within the second virtual experience.

The advertising component 130 may further transport avatars that interact or walk-through the portal in the second virtual experience, back to the first virtual experience. Upon transporting the avatar back to the first virtual experience, the advertising component may utilize the metrics for further tailoring of advertising for the transported users, and/or other users.

Hereinafter, a basic flow of interactive digital advertising using interactive user engagement portals is described with reference to FIG. 2.

Figure 2:
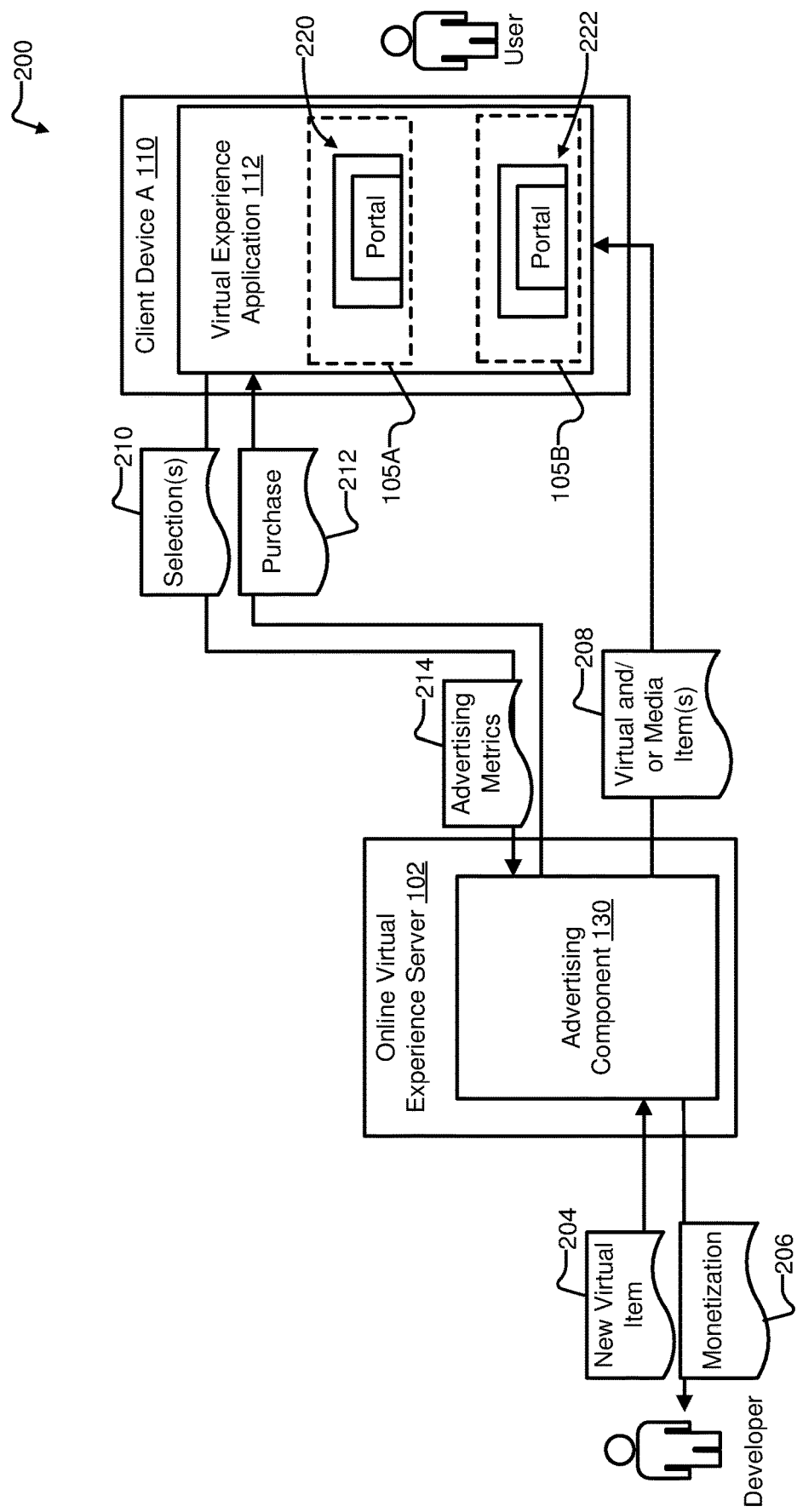
FIG. 2 is a diagram of an example system architecture to implement interactive digital advertisements, in accordance with some implementations.

FIG. 2: System Architecture

FIG. 2 is a diagram of an example system architecture 200 to provide interactive digital advertising, in accordance with some implementations.

The system architecture 200 (also referred to as a "subsystem" herein) includes the online virtual experience server 102, advertising component 130, and client device 110 executing virtual experience application 112. Online virtual experience server 102 and client device 110 may be arranged as described above with reference to FIG. 1, namely, in operative communication over network 122 (omitted here for clarity).

In one example, a developer may create a new virtual item 204 for deployment and use in a virtual experience. The new virtual item 204, as well as developer-specified settings for advertising the new virtual item 204, may be input into the advertising component 130. Several developer-specified settings may be used. For example, a creator of the new virtual item 204 may specify an amount of currency they would pay for X number of views, an amount of currency they would pay for Y number of try-ons, an amount of currency for Z number of purchases, and/or if the virtual item should be advertised to a particular type of user, subscriber, only premium users, or on another basis.

The advertising component 130 may take as input the new virtual item 204 and developer-specified settings for advertising, and create an ad profile for the respective developer and item 204 combination. For example, the developer may indicate one or more settings for advertising based upon any suitable advertising profile. In some implementations, the developer's settings may include configurable keywords that specify which items they do not want the advertising component 130 to display, configurable keywords that specify which items they want the advertising component 130 to display, minimum or maximum age thresholds for advertising, minimum or maximum gameplay hours for advertising, min/max number of items to advertise, radius of "geo-fence" to trigger the advertisement display, min/max number of users in the geo-fence to trigger the ad display, and/or other developer advertising settings.

The developer settings may also be controlled and/or overridden by more restrictive advertising campaign controls for a media item 208 (such as a virtual experience, game, product, brand, multiple associated brands, movie, film, sports team match, or other media items). The media item 208 may be produced by a separate party (from the developer) and may include any suitable media item that is part of an advertising campaign.

The new virtual item 204 may be associated with the media item 208. Accordingly, the new virtual item 204 may be arranged in many different manners including, but not limited to, with logos, visual changes, textures, or other attributes associated with the media item 208. For example, a sports match media item may include associated virtual items showing a team logo, sports stadium location/landmarks, or other attributes. For example, a movie media item may include virtual items such as costumes, items, weapons, or accessories from the movie. Other suitable attributes for media items are applicable. The developer may also logically associate the new virtual item 204 with a particular media item 208 that is part of an advertising campaign for the media item.

The advertising component 130 may receive indication that a user's avatar is participating in a first virtual experience 105A through the virtual experience application 112. The indication may include indication that a first avatar associated with a first user identifier (ID) is within a threshold radius (or within a geo-fence) of virtual user engagement portal 220 that is located within the first virtual experience 105A.

In some implementations, the advertising component 130 may display first media associated with the media item 208 at the virtual user engagement portal 220. The displayed first media may include a banner, image, or moving picture associated with the media item 208 and the user preferences associated with the avatar. For example, age-specific restrictions may inform a type of display. Other restrictions may also be applicable, including geographic or locale-specific restrictions.

In some implementations, a developer can place the virtual user engagement portal 220 anywhere within the first virtual experience 105A. In some implementations, a developer may place a number of virtual user engagement portals 220 within the first virtual experience 105A. In some implementations, various settings and/or restrictions in advertising may override the developer's request to add more than a threshold number of virtual user engagement stations to any particular virtual experience.

By approaching and walking into the virtual user engagement portal 220, the user's avatar may be transported from the virtual experience 105A to a second virtual experience 105B associated with the media item 208.

In some implementations, the avatar may be spawned into the second virtual experience 105B at any location. In some implementations, the avatar may be spawned in the second virtual experience 105B based upon an advertiser's preferences or selections. In some implementations, the avatar may be spawned in the second virtual experience 105B based upon a developer's preferences or selections. In some implementations, a plurality of spawn locations may exist in the second virtual experience 105B. Other variations on spawn locations and return portal locations may be applicable.

The second virtual experience 105B may be a tailored experience that incorporates one or more aspects of the media item 208 for interaction with by the user's avatar. For example, the second virtual experience 105B may include a movie experience with activities, items, and accessories associated with the particular movie. As another example, the second virtual experience 105B may include a TV series experience with activities, items, and accessories associated with the particular TV series. As another example, the second virtual experience 105B may include a sports team experience with activities, items, and accessories associated with the particular sports team. As another example, the second virtual experience 105B may include a concert experience associated with an artist or artists, with activities, items, and accessories associated with the artist or artists. As another example, the second virtual experience may be a new virtual experience available on the virtual experience platform 100. As another example, the second virtual experience may include a gameplay experience associated with a video game. Other formats of the second virtual experience may also be applicable. For example, other media items may include popular games (e.g., be transported directly into a game experience for a trial run), popular culture phenomena (e.g., visits with a pop-icon's avatar experience), particular songs (e.g., a karaoke experience), vehicles (e.g., a driving experience), or other media items and/or experiences may also be applicable.

Upon interaction by the user's avatar within the second virtual experience 105B, the user may select one or more items to interact with or purchase. If the avatar has selected (e.g., through selections 210) an item to interact with or try on, the advertising component 130 may temporarily allow the avatar to appear as if the virtual item is worn. If the user issues a selection 210 to purchase a virtual item, the selection 210 is processed by the advertising component 130 to effectuate the purchase 212. Thereafter, the avatar may be granted use of the purchased virtual item and the item placed into the associated user ID's inventory. Upon successful purchase, the advertising component 130 may also determine an associated monetization amount 206 to be transferred to the associated developer account. The monetization amount 206 may be in the form of virtual currency, in some implementations.

Within the second virtual experience 105B may also be presented a second configuration of the virtual user engagement portal, denoted 222. The virtual user engagement portal 222 may be arranged similar to the portal 220, but may lack digital banners or advertising, in some implementations. In some implementations, the portal 222 may alert the user that traversal brings the user back to the first virtual experience 105A. In some implementations, the portal 222 displays an "exit" banner. In some implementations, the portal 222 may display a second media display indicative of the content of the first virtual experience 105A (e.g., name of experience, game title, etc.). Other variations of the second portal 222 are also applicable. In some implementations, a plurality of return portals may exist in the second virtual experience 105B. Other variations on return portal locations may be applicable.

In some implementations, the portal 222 may be omitted or replaced by another graphical component, such as a beacon. In some implementations, the return functionality of the portal 222 may also be provided by a link that is rendered on a graphical user interface, that is rendered in a heads-up display format, and/or that is otherwise rendered and selectable by a user. In some implementations, the return functionality of the portal 222 may also be timer-based such that a user is automatically transported back to the first virtual experience 105A after an amount of time has lapsed. In some implementations, one or more of these return functionality features may be combined with other features, e.g., a return portal with an additional timer-based return after an allotted time has elapsed, a return portal with an additional link that is rendered separately (e.g., such that an avatar can use the portal or the user may select the return link at any time), and other suitable combinations.

Upon traversal of the user avatar through the portal 222, the avatar is transported from the second virtual experience 105B to the first virtual experience 105A in an automated manner. If the user has made purchases in the second virtual experience, those purchases remain available to the user.

It is noted that advertisers may also receive revenue through use of portals as described herein. In some implementations, advertisers place a bid for a price (e.g., maximum price) they're willing to pay per unique player or avatar. In some implementations, advertisers may pay a cost per transport through a portal. In some implementations, advertisers may pay a cost per unique visit to a second virtual experience.

A unique player is defined as a user that converts for a particular portal advertisement for the first time within a publisher experience. A unique portal visit is defined as a unique player visiting the portal during the experience. For example, Table 1 describes some examples of visitor designations given a type of interaction:

TABLE 1

| Type of Interaction | Type of Visitor |
| --- | --- |
| Player A in experience A teleports to branded experience using Portal A | Unique teleport attributed to experience A |
| Player A leaves the branded experience, re-joins experience A (either through Return Portal or the Home page), and teleports into branded experience using Portal A | Non-unique teleport |
| Player A leaves the branded experience, joins experience B and teleports to branded experience using Portal B | Unique teleport attributed to experience B |
| Player A leaves the branded experience, re-joins experience A and teleports into another branded experience using Portal C | Unique teleport to the another branded experience attributed to experience A |

In these and other examples, developer revenue share (e.g., monetization 206) is a percentage of total teleport value delivered for that advertisement (including above budget) multiplied by the budget (in over-delivery) or actual spend (in under-delivery). Other developer revenue shares may also be applicable.

It is also noted that unique advertising views/impressions may be tracked using the example embodiments described herein. For example, portal metrics may include engagement metrics based on use of portals. The advertising component 130 or another component may track engagement metrics.

Some examples of portal and advertising metrics include: How many total unique users in each group joined the virtual experience in one week? How many total impressions did the portal get in each group in one week? How many total visits did the portal get in each group in one week? How many total unique players came back into the game from the branded experience within a 24-hour period? For example, portal and advertising metrics may also include a total number of unique users in each group that joined the virtual experience in a given time period (e.g., one week). For example, portal and advertising metrics may also include the number of total impressions for the portal in each group within a time period (e.g., one week).

These and other portal and advertising metrics may be used to calculate at least a portion of engagement metrics.

Engagement metrics may also be utilized to calculate other advertising metrics 214, for example, by: average playtime of users for each group, average monetization conversion percentage of users for each group, average revenue per user for each group, and other impacts.

Some examples of advertising impressions may include: a percentage or amount of time spent viewing an advertisement. When considering virtual user engagement portals, impressions may be tracked by: determining an angle of incidence or angle of view based upon an avatar's perspective and distance from a portal, through analysis of an avatar's viewport or perspective, through analysis of an amount of time an avatar is within a threshold distance from a portal and within a threshold angle of view, and/or through analysis of a percentage of viewable surface of an advertising banner displayed at the portal. In some implementations, the minimum time to count as an advertising impression is one second and the distance between an avatar and the portal is close enough for the player to hear and see the portal.

Hereinafter, example visualizations and configurations of the virtual user engagement portal 220 and 222 are described in detail below with reference to FIG. 3 and FIG. 4.

Figure 3:
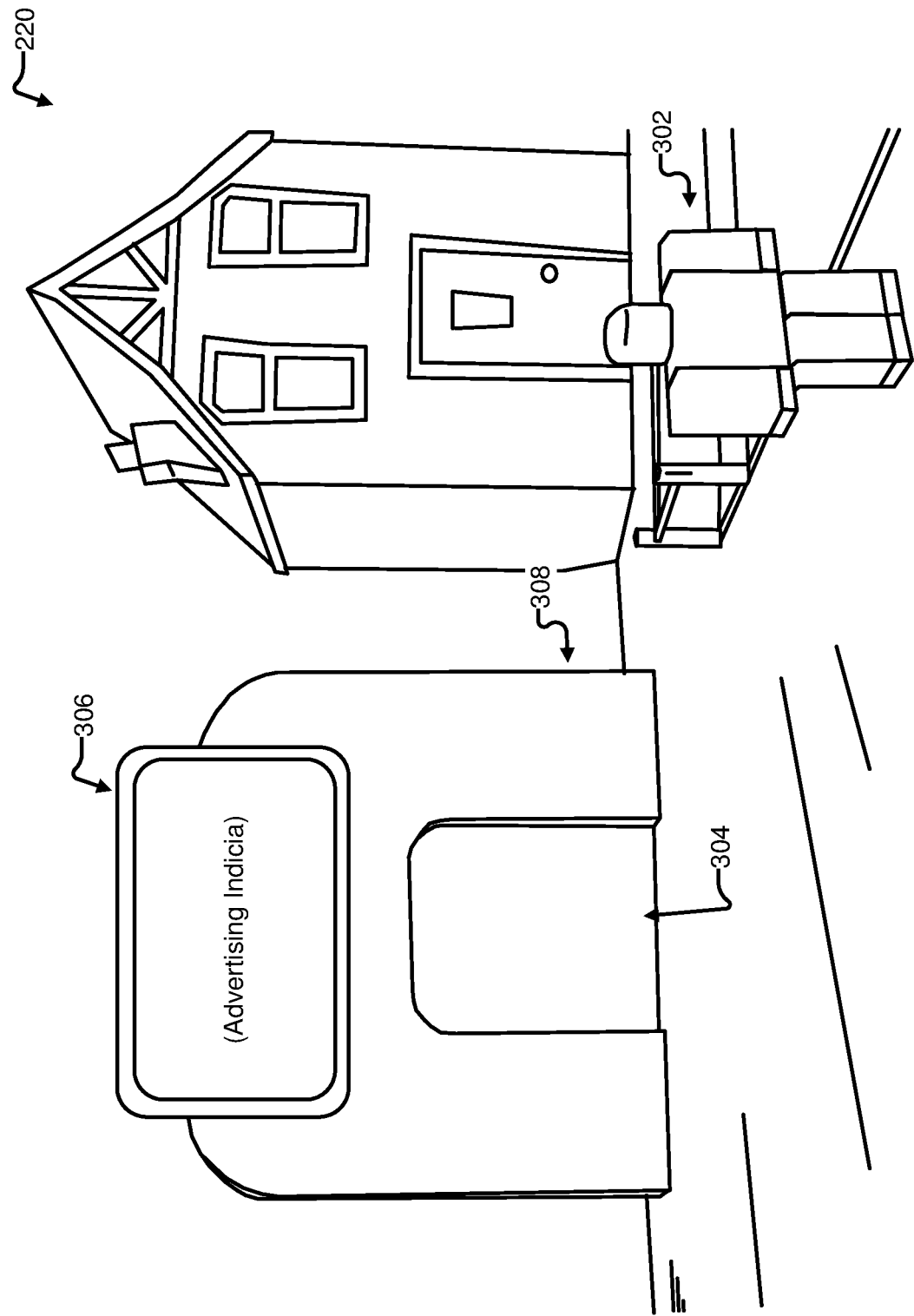
FIG. 3 is a perspective view of a virtual user engagement portal in a first configuration, in accordance with some implementations.

FIG. 3: Virtual User Engagement Portal

FIG. 3 is a perspective view of a virtual user engagement portal 220 in a first configuration, in accordance with some implementations. It is noted that the description provided in reference to FIG. 3 is illustrative only, and not limiting. For example, actual appearance of a virtual user engagement portal may be varied in many ways. Furthermore, the number, types, and displayed media may be altered in many ways. Moreover, the simplified schematic shown is for illustrative purposes only, and does not encompass all variations which may be applicable to example embodiments.

As shown in FIG. 3, the virtual user engagement portal 220 may comprise a display member 306 configured to display first media (or advertising indicia) associated with the at least one media item. The virtual user engagement portal 220 may also include a portal member 304 proximate the display member 306. Other display members 308 (such as lintels or doorway surrounds) may also be arranged proximate the portal member 304. The displayed first media may be displayed as a static or moving image, in some implementations.

In example embodiments, the virtual user engagement portal 220 may be placed anywhere within a virtual experience. The placement and number of virtual user engagement portals may be selected based upon developer settings, advertiser settings, user settings, and other suitable parameters, including parameters specified by the virtual experience platform operator and/or a director of a media campaign.

In some implementations, a developer can place the virtual user engagement portal 220 anywhere within the first virtual experience. In some implementations, a developer may place a number of virtual user engagement portals 220 within the first virtual experience. In some implementations, various settings and/or restrictions in advertising may override the developer's request to add more than a threshold number of virtual user engagement stations to any particular virtual experience.

In some implementations, an advertiser or a virtual experience platform operator may place constraints on an appearance of the portal 220 to ensure consistency with any advertising preferences. In some implementations, an advertiser or a virtual experience platform operator may place constraints on an appearance of the portal 220 to ensure consistency with virtual experience platform rules. In some implementations, an advertiser or a virtual experience platform operator may place constraints on an appearance of the portal 220 to ensure consistency or uniformity in all portals. In some implementations, an advertiser or a virtual experience platform operator may place constraints on an appearance of the portal 220 such that the portals 220 appear natural within the first virtual experience (e.g., at least partially matching a design aesthetic, background appearance, and/or theme of the first virtual experience).

As further illustrated, as a user's avatar 302 approaches the virtual user engagement portal 220, the display member 306 may display first media, and the portal member 304 may glow or emanate visual cues (and/or play audio cues) to denote an active portal. As the avatar 302 passes into the portal member 304, the avatar is transported to the second virtual experience.

Figure 4:
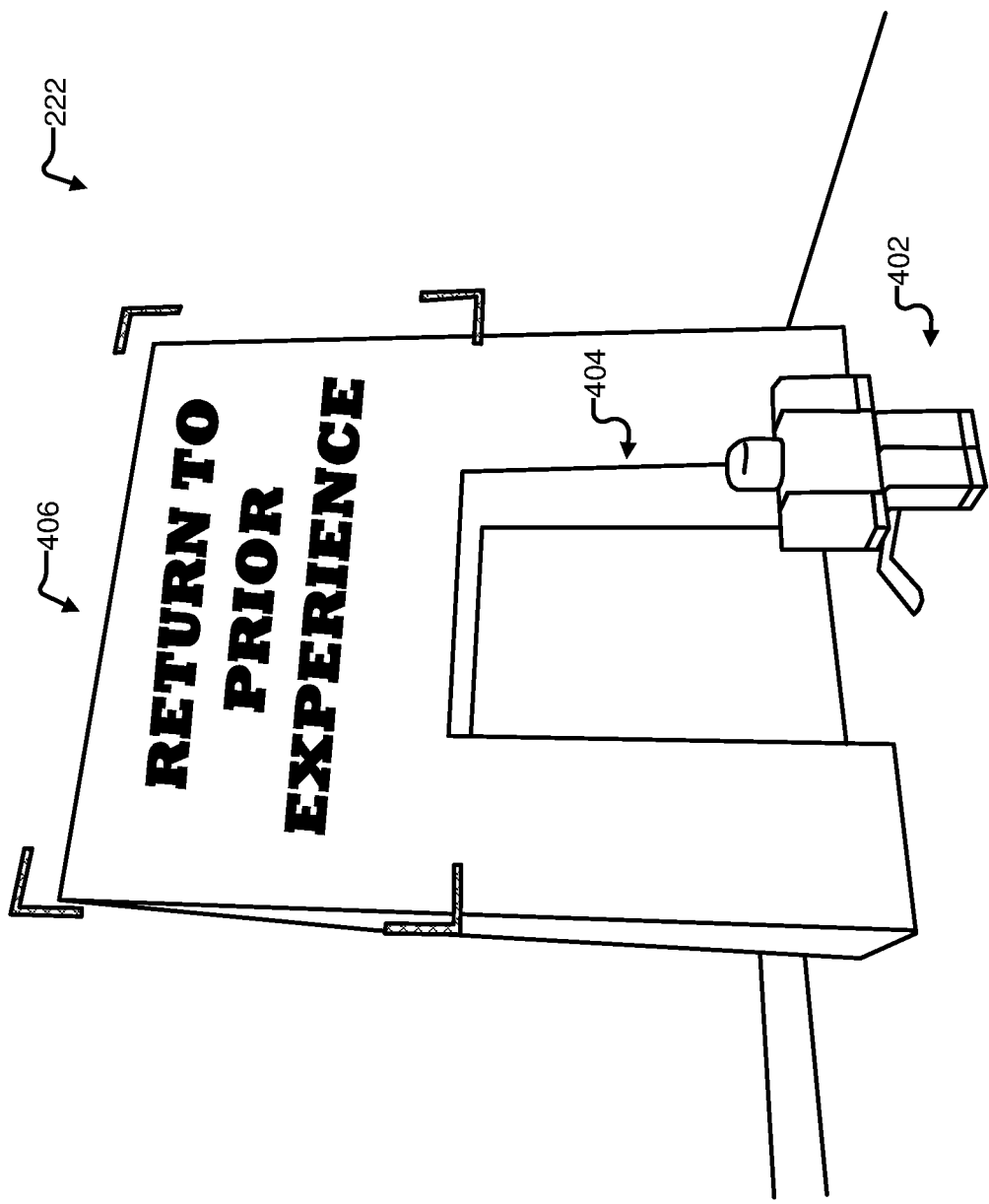
FIG. 4 is a perspective view of a virtual user engagement portal in a second configuration, in accordance with some implementations

FIG. 4: Virtual User Engagement Portal (Return Portal)

FIG. 4 is a perspective view of a virtual user engagement portal 222 in a second configuration, in accordance with some implementations. It is noted that the description provided in reference to FIG. 4 is illustrative only, and not limiting. For example, actual appearance of a virtual user engagement portal may be varied in many ways. Furthermore, the number, types, and displayed media items may be altered in many ways. Moreover, the simplified schematic shown is for illustrative purposes only, and does not encompass all variations which may be applicable to example embodiments.

As shown in FIG. 4, the virtual user engagement portal 222 may comprise a display member 406 configured to display an exit or return notification and a portal member 404 proximate the display member 406. Other display members may also be arranged proximate the portal member 404. The displayed exit or return notification may be displayed as a static or moving image, in some implementations.

As further illustrated, as a user's avatar 402 approaches the virtual user engagement portal 222, the display member 406 may display the exit or return notification, and the portal member 404 may glow or emanate visual cues (and/or play audio cues) to denote an active portal. As the avatar 402 passes into the portal member 404, the avatar is transported back to the first virtual experience, from the second virtual experience.

In some implementations, each second virtual experience can include a return portal that is configured to teleport avatars back to the original or first virtual experience. The return portal may display a return notification, an image representative of the first virtual experience, media representative of the first virtual experience, or other exit notifications or indicia. Moreover, while the portal 222 may be arranged to display different types of media and other content, the portal member 404 may include a logical connection to the first virtual experience in the same or similar manner as the portal member 304 having a logical connection to the second virtual experience. In this manner, the portal members 304 and 404 are logically coupled such that avatars may be transported to/from different virtual experiences.

In some implementations, the logical connection between portal members 304 and 404 is different for different users. For example, a different targeted advertising experience (e.g., the second virtual experience) may be provided for different users. In this manner, while a first user may be transported to a second virtual experience from the first virtual experience, a different user may be transported to a third virtual experience from the first virtual experience, when interacting with the portal member 404. Accordingly, many different, second virtual experiences (e.g., depending upon a particular avatar approaching a portal) may be logically coupled to the portal member.

In some implementations, the portal member 404 may be omitted or replaced by another graphical component, such as a beacon. In some implementations, the return functionality of the portal member 404 may also be provided by a link that is rendered on a graphical user interface, that is rendered in a heads-up display format, and/or that is otherwise rendered and selectable by a user. In some implementations, the return functionality of the portal member 404 may also be timer-based such that a user is automatically transported back to the first virtual experience after an amount of time has lapsed. In some implementations, one or more of these return functionality features may be combined with other features, e.g., a return portal member with an additional timer-based return after an allotted time has elapsed, a return portal member with an additional link that is rendered separately (e.g., such that an avatar can use the portal or the user may select the return link at any time), and other suitable combinations.

Hereinafter, methods of implementing interactive user engagement portals are described in detail with reference to FIG. 5.

Figure 5:
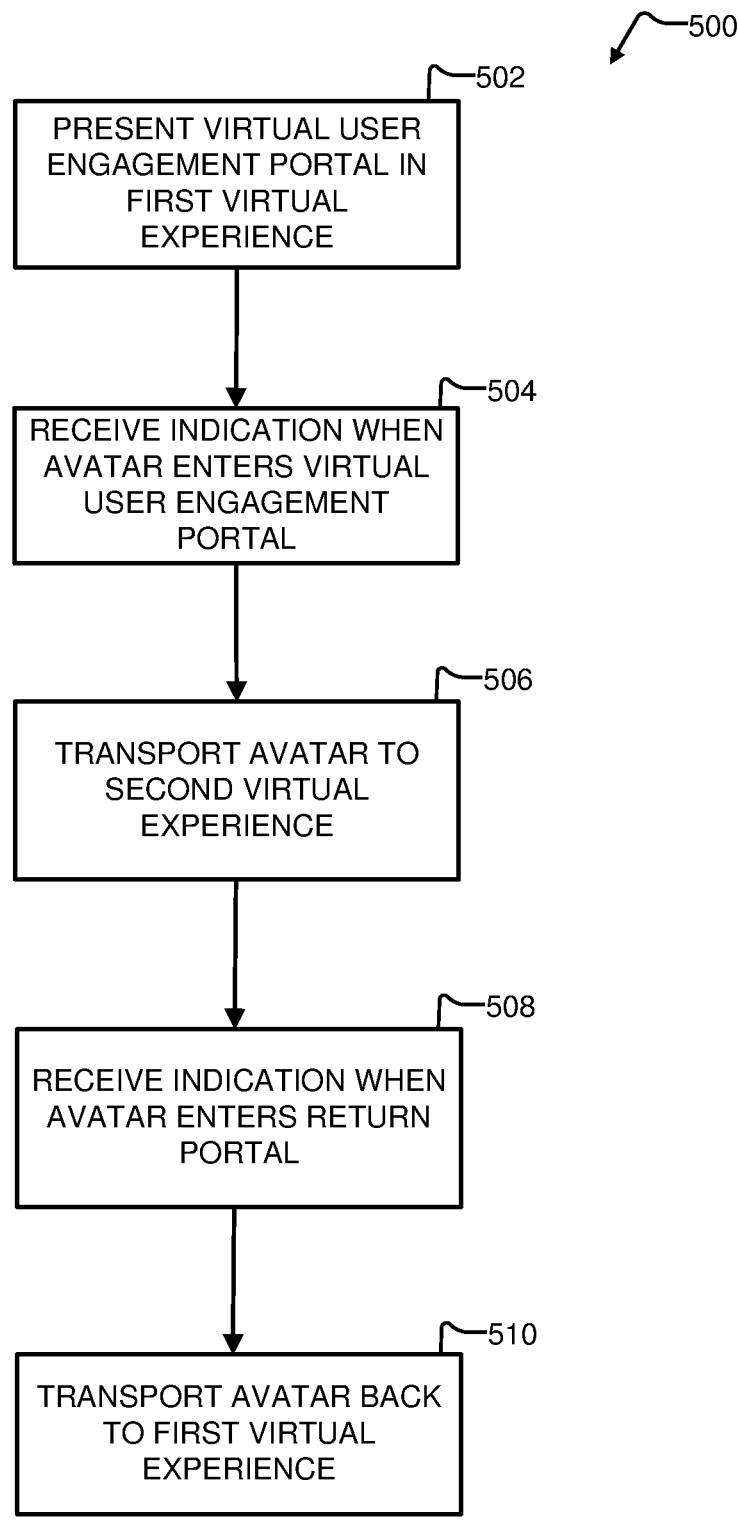
FIG. 5 is a flowchart of an example method of implementing virtual user engagement portals, in accordance with some implementations.

FIG. 5: Method of Transporting Avatars with Interactive Portals

FIG. 5 is a flowchart of an example method of implementing interactive user engagement portals, in accordance with some implementations.

In some implementations, method 500 can be implemented, for example, on a server 102 described with reference to FIG. 1 and FIG. 2. In some implementations, some or all of the method 500 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., a time since last advertisement exceeding a threshold, a number of transports exceeding a threshold, a predetermined time period having expired since the last performance of method 500 for a particular medial item or user, and/or one or more other conditions occurring which can be specified in settings read by the method.

Method 500 may begin at block 502. At block 502, a virtual user engagement portal 220 is presented in a first virtual experience. The virtual user engagement portal 220 may include a display member 306 configured to display an advertisement or other media, and a portal member 304 proximate the display member 306. The display member 306 is rendered and displayed in the first virtual experience, and the portal member 304 includes a logical connection from the first virtual experience to the second virtual experience. Additionally, the portal member 304 is displayed in both the first virtual experience and the second virtual experience. In some implementations, the first configuration 220 of the portal is displayed in the first virtual experience, while a second configuration 222 of the portal is displayed in the second virtual experience. Other variations are also applicable. Block 502 may be followed by block 504.

At block 504, indication an avatar enters the portal member 304 and/or the virtual user engagement portal 220 is received. For example, the advertising component 130 may receive the indication from the virtual experience engine 104, in some implementations. The platform 100 and/or other components may also receive the indication, in some implementations. Block 504 may be followed by block 506.

At block 506, the avatar is transported from the first virtual experience to the second virtual experience. For example, as the avatar enters the portal member 304, the platform 100 directs an associated client device to render the second virtual experience for the user associated with the avatar. The avatar may then be presented as though walking into the second virtual experience from a doorway or other opening. In some implementations, the transition from the first virtual experience to the second virtual experience may be provided in one or more manners, including: a fade-in transition, a fade-out then fade-in transition, a doorway transition, a swipe transition, a drop transition, or other transitions.

In some implementations, the avatar may be spawned into the second virtual experience at any location. In some implementations, the avatar may be spawned in the second virtual experience based upon an advertiser's preferences or selections. In some implementations, the avatar may be spawned in the second virtual experience based upon a developer's preferences or selections. In some implementations, a plurality of spawn locations may exist in the second virtual experience. Other variations on spawn locations and return portal locations may be applicable. Block 506 may be followed by block 508.

At block 508, indication the avatar enters a return portal (e.g., portal member 404) may be received. For example, the advertising component 130 may receive the indication from the virtual experience engine 104, in some implementations. The platform 100 and/or other components may also receive the indication, in some implementations. For example, while in the second virtual experience, the avatar may engage with and interact with a variety of virtual experience items, virtual items, media items, games, and other portions of the second virtual experience. For example, some virtual or media items can include clothes, accessories, and other items to personalize avatars. The advertising component 130 may record and/or store these and other interactions for determining user engagement metrics, advertising impressions, and other advertising metrics. Upon entering a return portion, the metrics may be recorded and user input may be received, indicative of a return to the first virtual experience. Block 508 may be followed by block 510.

At block 510, the avatar may be transported from the second virtual experience to the first virtual experience. For example, as the avatar enters the portal member 404 (e.g., the return portal member), the platform 100 directs an associated client device to render the first virtual experience for the user associated with the avatar. The avatar may then be presented as though walking into the first virtual experience from a doorway. In some implementations, the transition from the second virtual experience to the first virtual experience may be varied in one or more manners, including: a fade-in transition, a fade-out then fade-in transition, a doorway transition, a swipe transition, a drop transition, or other transitions.

In some implementations, the avatar may be spawned back into the first virtual experience at any location. In some implementations, the avatar may be spawned back into the first virtual experience based upon a developer's preferences or selections. In some implementations, the avatar may be spawned back into the first virtual experience based upon a user's preferences, selections, play history, and/or other considerations. In some implementations, a plurality of spawn locations may exist in the first virtual experience. Other variations on spawn locations may be applicable.

Blocks 502-510 can be performed (or repeated) in a different order than described above and/or one or more blocks can be omitted. For example, blocks 504-510 may be performed repeatedly as avatars engage with the virtual user engagement portal. Block 502 may be repeated for several different virtual user engagement portals to be placed within the first virtual experience. Method 500 can be performed on a server (e.g., 102) and/or a client device (e.g., 110). Furthermore, portions of the method 500 may be combined and performed in sequence or in parallel, according to any desired implementation.

Hereinafter, methods of interactive digital advertising based at least in part on virtual user engagement portals are described with reference to FIG. 5.

Figure 6:
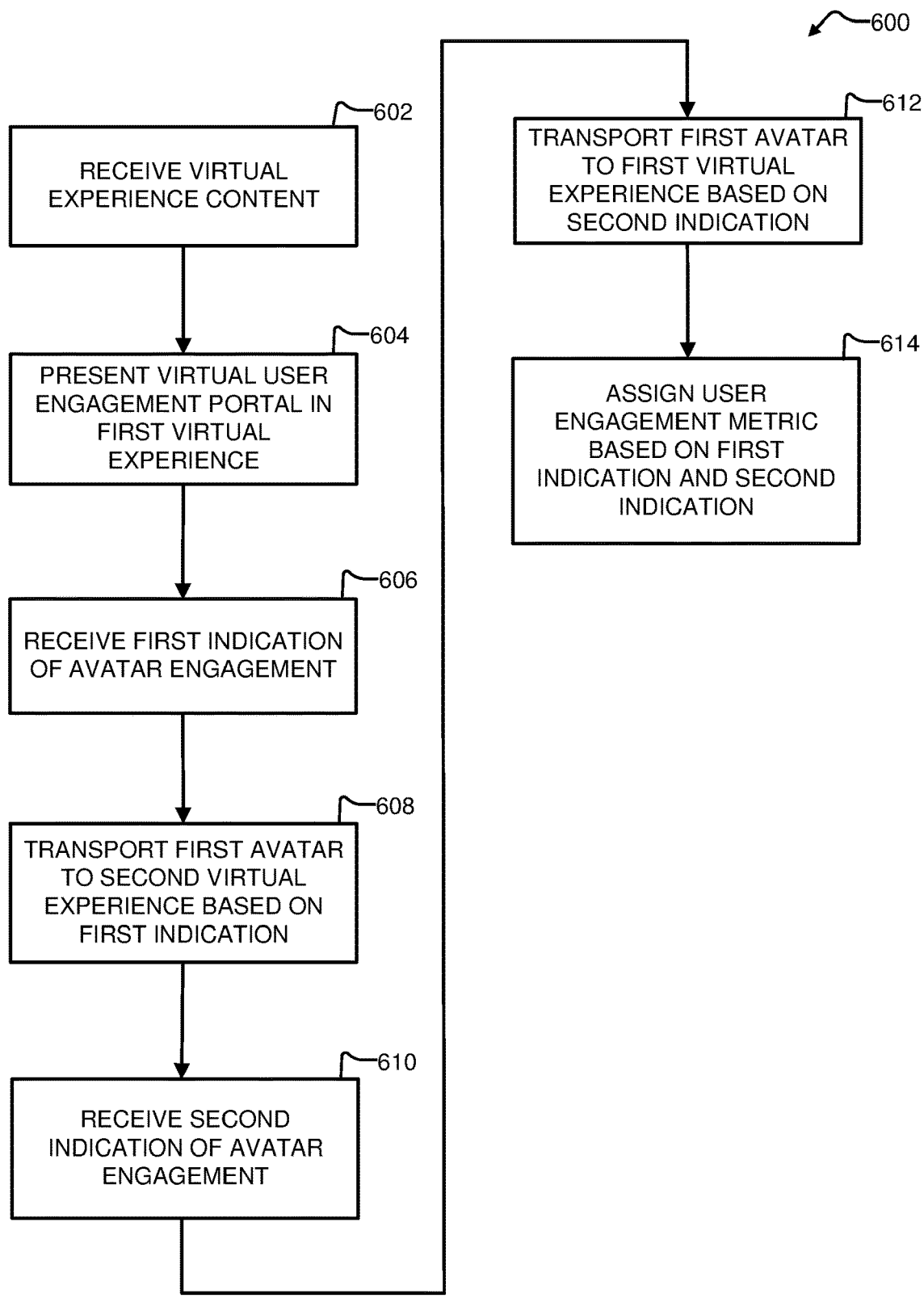
FIG. 6 is a flowchart of another example method of interactive digital advertising in accordance with some implementations.

FIG. 6: Method of Interactive Digital Advertising

FIG. 6 is a flowchart of an example method of interactive digital advertising, in accordance with some implementations.

In some implementations, method 600 can be implemented, for example, on a server 102 described with reference to FIG. 1 and FIG. 2. In some implementations, some or all of the method 600 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

In some implementations, the method 600, or portions of the method, can be initiated automatically by a system. In some implementations, the implementing system is a first device. For example, the method (or portions thereof) can be periodically performed, or performed based on one or more particular events or conditions, e.g., a time since last advertisement exceeding a threshold, a number of transports exceeding a threshold, a predetermined time period having expired since the last performance of method 600 for a particular medial item or user, and/or one or more other conditions occurring which can be specified in settings read by the method.

Method 600 may begin at block 602. At block 602, virtual experience content associated with a second virtual experience is received by, for example, advertising component 130. The received virtual experience content may include at least one media item. The at least one media item may be associated with an advertising campaign or other advertising event. The at least one media item may also be associated with a second user (e.g., and a second user ID) and/or a developer of the virtual experience platform. Block 602 may be followed by block 604.

At block 604, the received virtual experience content is presented within the first virtual experience in a virtual user engagement portal (e.g., see FIGS. 3-4). The virtual user engagement portal may include a display member configured to display first media associated with the at least one media item and a portal member proximate the display member. The display member is rendered and displayed in the first virtual experience, and the portal member includes a logical connection from the first virtual experience to the second virtual experience. Additionally, the portal member is displayed in both the first virtual experience and the second virtual experience. In some implementations, a first configuration 220 of the portal is displayed in the first virtual experience, while a second configuration 222 of the portal is displayed in the second virtual experience. Other variations are also applicable.

Placement of the virtual engagement portal may be based upon developer specified settings of the developer of the first virtual experience and/or an advertiser associated with the at least one media item and/or second virtual experience. A total number of engagement stations may be configurable by an operator of the online virtual experience platform. The limit can be set by the online virtual experience platform based on, but not limited to, a constant limit (e.g., 4 stations), number of game plays of the experience (e.g., game plays within specified ranges might grant the virtual experience developer one or more stations per range, to reward highly engaging virtual experiences with the ability to use more engagement stations), and/or to limit overlap of threshold radiuses and hence will dictate placement and number of engagement stations.

The display of the virtual engagement portal may be based on avatar proximity and/or other considerations. In some implementations, a display of the displayed first media and the portal member can be altered based upon avatar proximity to the virtual user engagement portal. In some implementations, a display of the displayed first media and the portal member can be altered to a second displayed media based upon an avatar in closest proximity to the virtual user engagement portal. In some implementations, a display of the displayed first media and the portal member can be altered to a second displayed media configured to be viewed by a second avatar associated, wherein the first displayed media is configured to be viewed by the first avatar. In some implementations, no media may be displayed for some avatars/users, for example, depending upon advertising preferences or user preferences. In some implementations, customized media may be displayed for each avatar in viewing distance of the virtual user engagement station, within the same first virtual experience. Other variations are also applicable, including altering the display such that no media is displayed, or a blank display member is displayed.

In some implementations, presenting the received virtual experience content and the virtual user engagement portal is based upon central controls comprising on or more of: number of advertisements per time period (e.g., 5 per day, etc.), types of advertisements (e.g., no unhealthy foods), desired users (e.g., age, gender, etc.), content-adjacency (e.g., advertiser doesn't want ads next to fighting games), behavior of the advertisement (e.g., no embedded functionality, maintain user experience), or other controls. Additionally, in some implementations, presenting the received virtual experience content is also based upon user preferences and/or developer preferences.

Block 604 may be followed by block 606.

At block 606, a first indication that a first avatar associated with a first user identifier (ID) has engaged with the portal member in the first virtual experience is received. In some implementations, the first indication may be received by the advertising component 130, or by another component of the platform 100. In some implementations, the first indication may be an indication that the avatar has entered into the portal member. In some implementations, the first indication may be indication that the avatar has abutted against or is walking (or moving) into the portal member. In some implementations, the first indication is indication that the avatar has crossed a threshold line representative of walking into the portal member. Block 606 may be followed by block 608.

At block 608, the first avatar is transported to the second virtual experience from the first virtual experience responsive to the first indication. For example, as the avatar enters the portal member, the platform 100 directs an associated client device to render the second virtual experience for the user associated with the avatar. The avatar may then be presented as though walking into the second virtual experience from a doorway or other opening. In some implementations, the transition from the first virtual experience to the second virtual experience may be varied in one or more manners, including: a fade-in transition, a fade-out then fade-in transition, a doorway transition, a swipe transition, a drop transition, or other transitions.

While in the second virtual experience, the first avatar may interact with various items displayed within the second virtual experience, may engage in activities within the second virtual experience, and/or may purchase various items in the second virtual experience. For example, in some implementations, the second virtual experience may be a virtual marketplace based upon the received virtual experience content, an advertising campaign, a product, a group of products, a brand, or other attributes.

The purchases may include a purchase request and completion of the purchasing request by the platform 100 or a third-party provider. In some implementations, the purchases may be in virtual currency based on virtual currency purchase amounts displayed within the second virtual experience. In some implementations, the purchases may include physical items.

In some implementations, purchasing may be effectuated through identification of a user ID associated with the purchased item. In these examples, the received media or virtual experience content is associated with a second user ID of the virtual experience platform, and the platform 100 may be configured to receive a purchase request for a virtual item responsive to the first indication and complete the purchase request.

In some implementations, the purchase request includes a virtual currency amount displayed in association with the virtual item in the second virtual experience. The virtual currency amount may be displayed in proximity of the virtual item for purchase and/or with clear markings or indications that a purchase is required.

In some implementations, the virtual item may be associated with a physical item. In these and similar examples, attributes of the physical item are displayed in the second virtual experience. For example, different sizes, scales, and other product attributes may be displayed in the second virtual experience. In these examples, the platform 100 may also complete a retail transaction including the physical item.

In some implementations, the virtual item may include functional attributes affecting avatar-behavior of an avatar purchasing the virtual item. For example, the functional attributes can include one or more of: speed of avatar motion, height of avatar jumps, strength of avatar interactions, size of avatar, or any other suitable functional attribute. In this manner, avatars may interact with and purchase virtual items that affect avatar behavior for gaining gameplay functionality for a virtual experience different than the second virtual experience. In these and other examples, the functional attributes may be displayed in the second virtual experience. In some implementations, the virtual items inform the functional attributes implicitly (e.g., running shoes increase speed, hiking shoes increase endurance, dancing shoes increase dexterity, gloves increase strength, hats increase protection, etc.). In some implementations, different versions of virtual items may have increased or decreased functional attributes associated therewith. In some implementations, the functional attributes may be altered through a virtual currency pricing structure. These and other examples may be combined in any manner in different aspects of the second virtual experience.

Other interactions within the second virtual experience may also be tracked, categorized, and/or stored with appropriate user permissions. These and other interactions may be utilized in developing other unique virtual experiences whereby users are presented with more meaningful advertising experiences in the future. Block 608 may be followed by block 610.

At block 610, a second indication that the first avatar has engaged with the portal member in the second virtual experience is received. In some implementations, the second indication may be received by the advertising component 130, or by another component of the platform 100. In some implementations, the second indication may be an indication that the avatar has entered into the return portal member. In some implementations, the second indication may be indication that the avatar has abutted against or is otherwise walking into the return portal member. In some implementations, the second indication is indication that the avatar has crossed a threshold line representative of walking (or moving) into the return portal member. Block 610 may be followed by block 612.

At block 612, the first avatar is transported to the first virtual experience from the second virtual experience responsive to the second indication. For example, as the avatar enters the portal member 404 (e.g., the return portal member), the platform 100 directs an associated client device to render the first virtual experience for the user associated with the avatar. The avatar may then be presented as though walking into the first virtual experience from a doorway. In some implementations, the transition from the second virtual experience to the first virtual experience may be varied in one or more manners, including: a fade-in transition, a fade-out then fade-in transition, a doorway transition, a swipe transition, a drop transition, or other transitions.

If any purchases were made while in the second virtual experience, the purchases may be associated with the first user ID and may remain in effect after the avatar returns to the first virtual experience. Block 612 may be followed by block 614.

At block 614, a user engagement metric is assigned to (or associated with) the at least one media item based upon the first indication and the second indication. In some implementations, the user engagement metric comprises at least an amount of time spent in the second virtual experience. In some implementations, the user engagement metric further comprises one or more of: a number of purchases related to the at least one media item, a number of unique visits to the second virtual experience, and a number of revisits to the second virtual experience.

In some implementations, the user engagement metric also comprises one or more of: a duration of a view of the displayed first media, a continuous duration of a view of the displayed first media, legibility based on first avatar distance to the displayed first media, percentage of displayed first media that is viewable to the first avatar, or angle of view between the displayed first media and the first avatar.

In some implementations, the user engagement metric also comprises one or more of: engagement with the displayed first media, the first indication, the second indication, an amount of time between the first indication and the second indication, a percentage of rendering of the second virtual experience before the second indication, playtime in the second virtual experience, activities in the second virtual experience, purchases in the second virtual experience, avatar interactions with virtual items in the second virtual experience, or avatar interactions with non-player characters in the second virtual experience.

The user engagement metric and other data may be stored using a first type of data structure used to track engagement with the media item. For example, the first data structure can include a virtual experience origin location portion, a virtual currency wallet portion, and an engagement data portion. In some implementations, assigning the user engagement metric comprises retrieving user engagement data from the engagement data portion of the first data structure, and aggregating the retrieved user engagement data with other engagement data associated with the at least one media item. Other variations may also be applicable.

In some implementations, the user engagement metric may be supplemented or also include an advertising or portal metric. For example, the user engagement metric may be output alongside an advertising or portal metric based upon the at least one media item, and/or based upon advertising impressions calculated based upon an avatar and the virtual user engagement portal. For example, portal and advertising metrics may include a total number of unique users in each group that joined the virtual experience in a given time period (e.g., one week). For example, portal and advertising metrics may also include the number of total impressions for the portal in each group within a time period (e.g., one week).

These and other portal and advertising metrics may also be used to calculate at least a portion of the user engagement metric.

Engagement metrics may also be utilized to calculate other advertising metrics, for example, by: average playtime of users for each group, average monetization conversion percentage of users for each group, average revenue per user for each group, and other impacts.

Some examples of advertising impressions may include: a percentage or amount of time spent viewing an advertisement. When considering virtual user engagement portals, impressions may be tracked by: determining an angle of incidence or angle of view based upon an avatar's perspective and distance from a portal, through analysis of an avatar's viewport or perspective, through analysis of an amount of time an avatar is within a threshold distance from a portal and within a threshold angle of view, and/or through analysis of a percentage of viewable surface of an advertising banner displayed at the portal. In some implementations, the minimum time to count as an advertising impression is one second and the distance between an avatar and the portal is close enough for the player to hear and see the portal.

Block 614 may include any user engagement metric, and may also include any advertising metric or portal metric as described herein.

Blocks 602-614 can be performed (or repeated) in a different order than described above and/or one or more blocks can be omitted. For example, block 614 may be performed one or more times after the first indication and before the second indication. Method 600 can be performed on a server (e.g., 102) and/or a client device (e.g., 110). Furthermore, portions of the method 600 may be combined and performed in sequence or in parallel, according to any desired implementation.

Hereinafter, a more detailed description of various computing devices that may be used to implement different devices and/or components illustrated in FIGS. 1-2 is provided with reference to FIG. 7.

Figure 7:
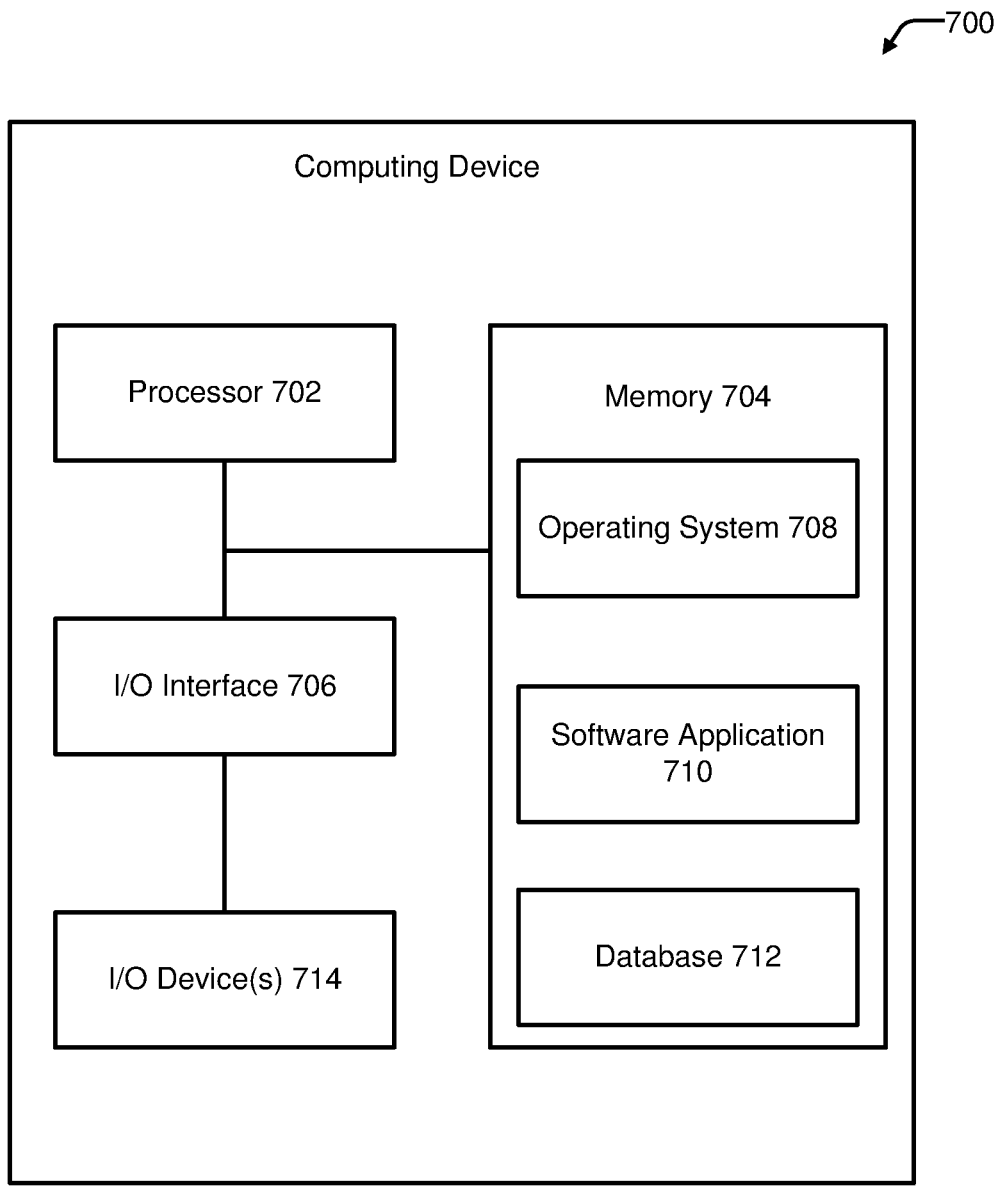
FIG. 7 is a block diagram illustrating an example computing device, in accordance with some implementations.

FIG. 7 is a block diagram of an example computing device 700 which may be used to implement one or more features described herein, in accordance with some implementations. In one example, device 700 may be used to implement a computer device, (e.g., 102, 110 of FIG. 1 and FIG. 2), and perform appropriate operations as described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 700 includes a processor 702, a memory 704, input/output (I/O) interface 706, and audio/video input/ output devices 714 (e.g., display screen, touchscreen, display goggles or glasses, audio speakers, headphones, microphone, etc.).

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, software application 710 and associated data 712. In some implementations, the applications 710 can include instructions that enable processor 702 to perform the functions described herein, e.g., some or all of the method of FIG. 5 and FIG. 6. Software application 710 may include some or all of the functionality required to present interactive digital advertisements. In some implementations, one or more portions of software application 710 may be implemented in dedicated hardware such as an application-specific integrated circuit (ASIC), a programmable logic device (PLD), a field-programmable gate array (FPGA), a machine learning processor, etc. In some implementations, one or more portions of software application 710 may be implemented in general purpose processors, such as a central processing unit (CPU) or a graphics processing unit (GPU). In various implementations, suitable combinations of dedicated and/or general purpose processing hardware may be used to implement software application 710.

For example, software application 710 stored in memory 704 can include instructions for retrieving user data, for displaying/presenting interactive digital advertisements, and/or other functionality or software such as the advertising component 130, VE Engine 104, and/or VE Application 112. Any of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 108), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 7 shows one block for each of processor 702, memory 704, I/O interface 706, software blocks 708 and 710, and database 712. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 500 and/or method 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

In situations in which certain implementations discussed herein may obtain or use user data (e.g., user demographics, user behavioral data, user contextual data, user settings for advertising, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of digital advertising within a first virtual experience provided at a virtual experience platform, the method comprising:
   receiving virtual experience content associated with a second virtual experience, the received virtual experience content including at least one media item;
   presenting the received virtual experience content within the first virtual experience in a virtual user engagement portal, the virtual user engagement portal having a display member configured to display first media associated with the at least one media item and a portal member proximate the display member, wherein the display member is rendered and displayed in the first virtual experience, wherein the portal member includes a logical connection from the first virtual experience to the second virtual experience, and wherein the portal member is displayed in both the first virtual experience and the second virtual experience;
   receiving first indication that a first avatar associated with a first user identifier (ID) has engaged with the portal member in the first virtual experience;
   transporting the first avatar to the second virtual experience from the first virtual experience responsive to the first indication;
   receiving second indication that the first avatar has engaged with the portal member in the second virtual experience;
   transporting the first avatar to the first virtual experience from the second virtual experience responsive to the second indication; and
   assigning a user engagement metric to the at least one media item based upon the first indication and the second indication.

2. The computer-implemented method of claim 1, wherein the received virtual experience content is associated with a second user ID of the virtual experience platform, the method further comprising:
   receiving a purchase request for a virtual item in the second virtual experience; and
   completing the purchase request.

3. The computer-implemented method of claim 2, wherein the purchase request includes a virtual currency amount displayed in association with the virtual item in the second virtual experience.

4. The computer-implemented method of claim 2, wherein the virtual item is associated with a physical item, wherein attributes of the physical item are displayed in the second virtual experience, the computer-implemented method further comprising:
   completing a transaction at the virtual experience platform, the transaction including the physical item.

5. The computer-implemented method of claim 1, wherein the second virtual experience is a virtual marketplace that includes the at least one media item.

6. The computer-implemented method of claim 1, wherein the user engagement metric comprises at least an amount of time spent in the second virtual experience.

7. The computer-implemented method of claim 6, wherein the user engagement metric further comprises one or more of: a number of purchases related to the at least one media item, a number of unique visits to the second virtual experience, and a number of revisits to the second virtual experience.

8. The computer-implemented method of claim 1, further comprising:
  storing a first data structure associated with the first user ID in a database, the first data structure comprising a virtual experience origin location portion, a virtual currency wallet portion, and an engagement data portion.

9. The computer-implemented method of claim 8, wherein assigning the user engagement metric comprises:
  retrieving user engagement data from the engagement data portion of the first data structure; and
  aggregating the retrieved user engagement data with other engagement data associated with the at least one media item.

10. The computer-implemented method of claim 1, further comprising altering a display of the displayed first media and the portal member based upon the first user ID and avatar proximity to the virtual user engagement portal.

11. The computer-implemented method of claim 10, wherein altering the display comprises altering the display member to display a second media based upon an avatar in closest proximity to the virtual user engagement portal.

12. The computer-implemented method of claim 10, wherein altering the display comprises altering the display member to display a second media configured to be viewed by a second avatar associated with a second user ID, wherein the first displayed media is configured to be viewed by the first avatar, and wherein the first avatar and the second avatar are within the first virtual experience.

13. The computer-implemented method of claim 10, wherein altering the display comprises displaying customized media based upon an avatar viewing the virtual user engagement portal.

14. The computer-implemented method of claim 1, wherein the user engagement metric comprises one or more of: a duration of a view of the displayed first media, a continuous duration of a view of the displayed first media, legibility of the displayed first media based on first avatar distance to the displayed first media, percentage of the displayed first media that is viewable to the first avatar, or angle of view between the displayed first media and the first avatar.

15. The computer-implemented method of claim 1, wherein the user engagement metric comprises one or more of: engagement with the displayed first media, the first indication, the second indication, an amount of time between the first indication and the second indication, a percentage of rendering of the second virtual experience before the second indication, playtime in the second virtual experience, activities in the second virtual experience, purchases in the second virtual experience, avatar interactions with virtual items in the second virtual experience, or avatar interactions with non-player characters in the second virtual experience.

16. The computer-implemented method of claim 2, wherein the virtual item comprises functional attributes that modify avatar-behavior of an avatar associated with a user ID that purchases the virtual item.

17. The computer-implemented method of claim 16, wherein the functional attributes comprise one or more of: speed of avatar motion, height of avatar jump, strength of avatar interaction, or size of avatar.

18. The computer-implemented method of claim 1, wherein presenting the received virtual experience content and the virtual user engagement portal is based upon controls comprising on or more of: number of advertisements per time period, types of advertisements, desired users, content-adjacency, or behavior of the advertisement.

19. A non-transitory computer-readable medium with instructions stored thereon that, responsive to execution by a processing device, causes the processing device to perform operations comprising:
  receiving virtual experience content associated with a second virtual experience, the received virtual experience content including at least one media item;
  presenting the received virtual experience content within the first virtual experience in a virtual user engagement portal, the virtual user engagement portal having a display member configured to display first media associated with the at least one media item and a portal member proximate the display member, wherein the display member is rendered and displayed in the first virtual experience, wherein the portal member includes a logical connection from the first virtual experience to the second virtual experience, and wherein the portal member is displayed in both the first virtual experience and the second virtual experience;
  receiving first indication that a first avatar associated with a first user identifier (ID) has engaged with the portal member in the first virtual experience;
  transporting the first avatar to the second virtual experience from the first virtual experience responsive to the first indication;
  receiving second indication that the first avatar has engaged with the portal member in the second virtual experience;
  transporting the first avatar to the first virtual experience from the second virtual experience responsive to the second indication; and
  assigning a user engagement metric to the at least one media item based upon the first indication and the second indication.

20. A system comprising:
  a memory with instructions stored thereon; and
  a processing device, coupled to the memory and operable to access the memory, wherein the instructions when executed by the processing device, cause the processing device to perform operations including:
    receiving virtual experience content associated with a second virtual experience, the received virtual experience content including at least one media item;
    presenting the received virtual experience content within the first virtual experience in a virtual user engagement portal, the virtual user engagement portal having a display member configured to display first media associated with the at least one media item and a portal member proximate the display member, wherein the display member is rendered and displayed in the first virtual experience, wherein the portal member includes a logical connection from the first virtual experience to the second virtual experience, and wherein the portal member is displayed in both the first virtual experience and the second virtual experience;

receiving first indication that a first avatar associated with a first user identifier (ID) has engaged with the portal member in the first virtual experience;

transporting the first avatar to the second virtual experience from the first virtual experience responsive to the first indication;

receiving second indication that the first avatar has engaged with the portal member in the second virtual experience;

transporting the first avatar to the first virtual experience from the second virtual experience responsive to the second indication; and assigning a user engagement metric to the at least one media item based upon the first indication and the second indication.

* * * * *